(12) United States Patent
Tanis

(10) Patent No.: US 7,484,916 B1
(45) Date of Patent: Feb. 3, 2009

(54) MACHINING CENTER WITH IMPROVED DRAW BAR ALIGNMENT

(75) Inventor: Richard K. Tanis, Fennville, MI (US)

(73) Assignee: Tanis Technologies, LLC, Holland, MI (US)

( * ) Notice: Subject to any disclaimer, the term of this patent is extended or adjusted under 35 U.S.C. 154(b) by 0 days.

(21) Appl. No.: 12/114,907

(22) Filed: May 5, 2008

(51) Int. Cl.
*B23Q 11/10* (2006.01)

(52) U.S. Cl. .................. 409/233; 409/136; 285/94; 285/98; 285/101; 137/580; 137/798

(58) Field of Classification Search ......... 409/135–136, 409/233, 232, 231; 408/239 R, 239 A, 240, 408/56, 57, 59; 285/95, 98, 101; 137/580, 137/798
See application file for complete search history.

(56) References Cited

U.S. PATENT DOCUMENTS

| 3,949,462 | A |   | 4/1976  | de Caussin     |         |
|-----------|---|---|---------|----------------|---------|
| 3,955,267 | A |   | 5/1976  | de Caussin     |         |
| 4,320,999 | A |   | 3/1982  | Briese         |         |
| 4,534,803 | A |   | 8/1985  | Asano et al.   |         |
| 5,022,278 | A |   | 6/1991  | DeCaussin      |         |
| 5,039,261 | A | * | 8/1991  | Takada         | 409/136 |
| 5,104,268 | A |   | 4/1992  | Kitagawa et al.|         |
| 5,205,686 | A |   | 4/1993  | de Caussin     |         |
| 5,300,006 | A |   | 4/1994  | Tanaka et al.  |         |
| 5,552,605 | A |   | 9/1996  | Arata          |         |
| 5,613,929 | A |   | 3/1997  | Bayer          |         |
| 5,626,448 | A |   | 5/1997  | Huang et al.   |         |
| 5,649,887 | A |   | 7/1997  | Taki et al.    |         |
| 5,662,442 | A |   | 9/1997  | Taki et al.    |         |
| 5,707,186 | A | * | 1/1998  | Gobell et al.  | 409/136 |
| 5,820,536 | A |   | 10/1998 | Sato           |         |
| 5,823,722 | A |   | 10/1998 | Takenaka       |         |
| 5,961,156 | A |   | 10/1999 | Furuhashi      |         |
| 5,971,681 | A |   | 10/1999 | Wolfe et al.   |         |
| 6,029,695 | A | * | 2/2000  | Logan          | 137/580 |
| 6,149,562 | A |   | 11/2000 | Patel et al.   |         |
| 6,317,646 | B1|   | 11/2001 | de Caussin et al.|       |
| 6,494,821 | B1|   | 12/2002 | Patel et al.   |         |
| 6,533,509 | B1| * | 3/2003  | Antoun         | 409/233 |

(Continued)

FOREIGN PATENT DOCUMENTS

SU          1389988 A1 *  4/1988

*Primary Examiner*—Erica E Cadugan
(74) *Attorney, Agent, or Firm*—Robert K. Roth; Miller, Canfield, Paddock and Stone, PLC

(57) ABSTRACT

A machining center having a draw bar extending through a spindle with coolant positioned inside the draw bar for cooling a tool comprises a piston rod movable between an operating position and an extended position, a drive post rotatable about an axis of rotation, operatively connected to the draw bar, a coolant union comprising a non-rotatable portion and rotatable portion, wherein the drive post is attached to the rotatable portion such that the rotatable portion is rotatable with the drive post about the axis of rotation, and a bridge, wherein the drive post extends through the bridge to attach to the coolant union and the bridge permits rotation of the drive post but resists dislocation of the drive post from the axis of rotation. Movement of the piston rod from the operating position to the extended position moves the drive post and coolant union to an extended position.

12 Claims, 3 Drawing Sheets

U.S. PATENT DOCUMENTS

| | | |
|---|---|---|
| 6,641,511 B2 | 11/2003 | Patel et al. |
| 6,692,202 B2 * | 2/2004 | Katsuzawa et al. .......... 409/135 |
| 6,923,624 B2 | 8/2005 | Tsai |
| 6,998,810 B2 | 2/2006 | Kameyama |
| 7,229,395 B2 | 6/2007 | Yoshida |
| 2007/0034265 A1 * | 2/2007 | Mohr et al. ................. 137/580 |

* cited by examiner

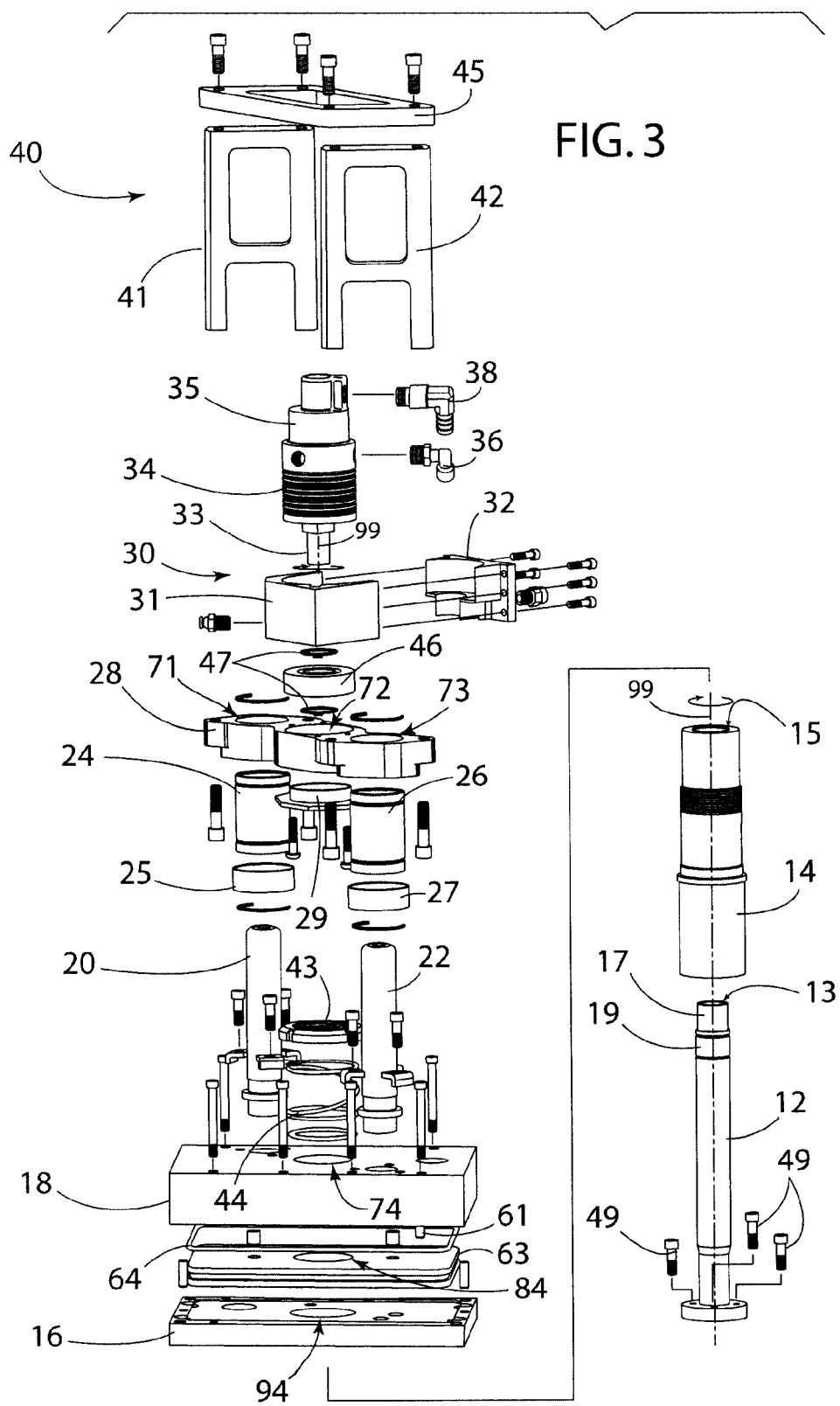

MACHINING CENTER WITH IMPROVED DRAW BAR ALIGNMENT

FIELD OF THE INVENTION

This invention relates to improvements in machining centers, and more particularly to improvements in alignment of draw bars used in such machining centers.

BACKGROUND OF THE INVENTION

Machining centers are used for performing one or more of several operations on manufactured parts, such as drilling, grinding, cutting, etc. Machining centers can comprise, for example, an industrial machine tool attached to a rapidly rotating spindle. The tool, such as a drill, is attached to the spindle with conventional collet chuck or other similar attachment mechanism. The spindle is connected to a draw bar which extends through the spindle. Typically a drive belt and pulley assembly rotate the spindle tool and draw bar at high speeds. A channel may be provided in the draw bar to provide coolant to the tool. An example of a known machining center with a draw bar and spindle is shown in U.S. Pat. No. 5,022,278 to DeCaussin.

Machining centers that have a channel for coolant are known to have a problem with leakage of that coolant. It has been found that the coolant can spray across the interior of the machining center, requiring machine center down time, repair and service. It would be highly desirable to provide a machining center with improved draw bar alignment which reduces leaking of coolant fluid.

SUMMARY OF THE INVENTION

In accordance with a first aspect, a machining center having a draw bar extending through a spindle with coolant positioned inside the draw bar for cooling a tool comprises a piston rod movable between an operating position and an extended position, a drive post rotatable about an axis of rotation, operatively connected to the draw bar, a coolant union comprising a non-rotatable portion and rotatable portion, wherein the drive post is attached to the rotatable portion such that the rotatable portion is rotatable with the drive post about the axis of rotation, and a bridge, wherein the drive post extends through the bridge to attach to the coolant union and the bridge permits rotation of the drive post but resists dislocation of the drive post from the axis of rotation. Movement of the piston rod from the operating position to the extended position moves the drive post and coolant union to an extended position.

From the foregoing disclosure and the following more detailed description of various preferred embodiments it will be apparent to those skilled in the art that the present invention provides a significant advance in the technology of machining centers. Particularly significant in this regard is the potential the invention affords for providing a high quality, low cost machining center with reduced coolant leak. Additional features and advantages of various preferred embodiments will be better understood in view of the detailed description provided below.

BRIEF DESCRIPTION OF THE DRAWINGS

FIG. 3 is an exploded view of the improved draw bar alignment device of FIG. 1.

Figure 1:
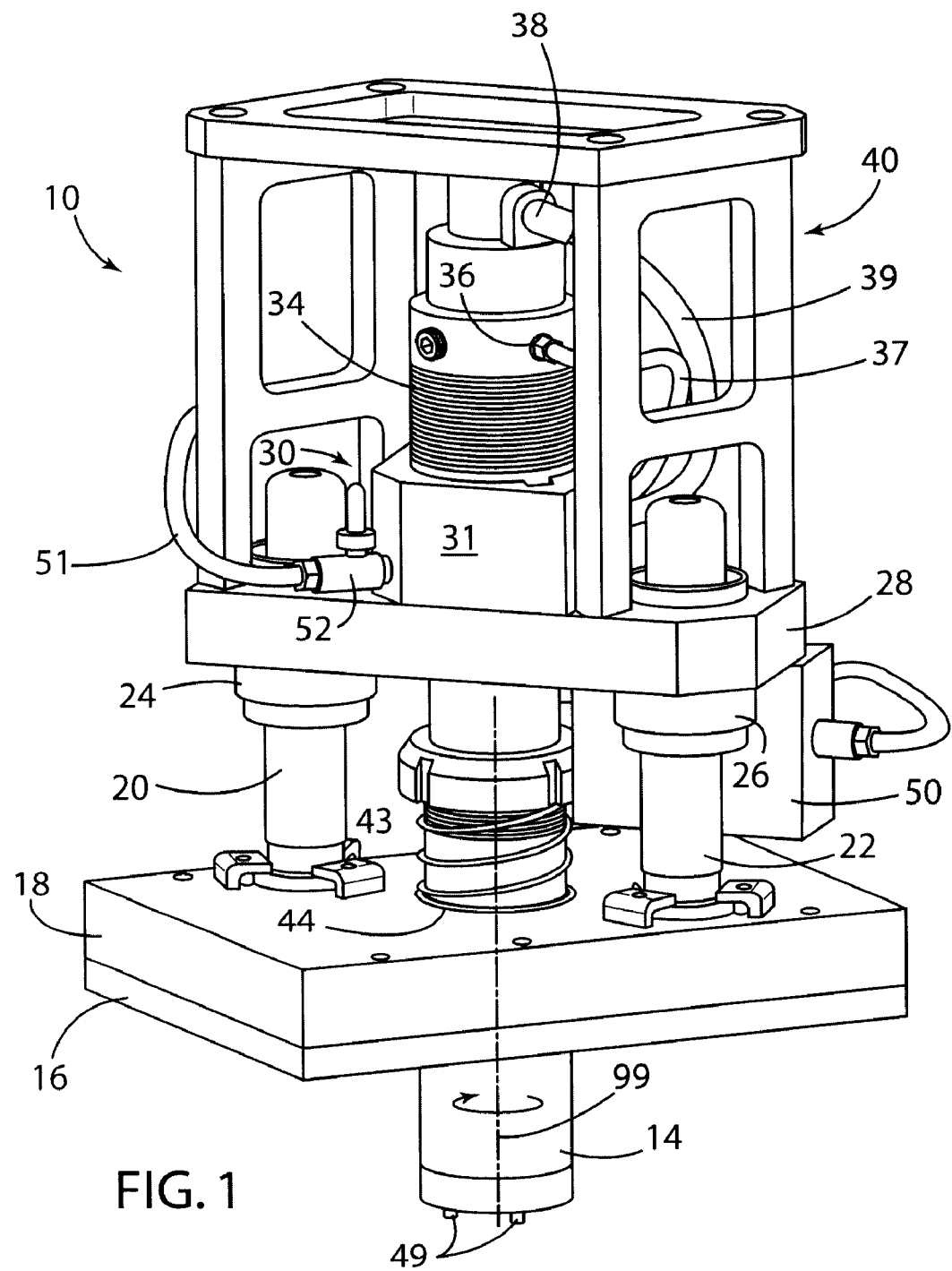
FIG. 1 is an isometric view of an improved draw bar alignment device for a machining center in accordance with a preferred embodiment.

It should be understood that the appended drawings are not necessarily to scale, presenting a somewhat simplified representation of various preferred features illustrative of the basic principles of the invention. The specific design features of the machining center as disclosed here, including, for example, the specific dimensions of the coolant union, will be determined in part by the particular intended application and use environment. Certain features of the illustrated embodiments have been enlarged or distorted relative to others to enhance visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved machining center disclosed here. The following detailed discussion of various alternative and preferred features and embodiments will illustrate the general principles of the invention with reference to a machining center with rapidly rotating components and coolant for cooling those components. Other embodiments suitable for other applications will be apparent to those skilled in the art given the benefit of this disclosure.

Referring now to the drawings, FIG. 1 shows an assembly view of part of a machining center 10 shown in a normal, operating position. Numerous design constraints have to simultaneously satisfied. These include introducing coolant through a channel in a draw bar (shown in FIG. 2) to help keep a tool cool, and holding the draw bar with coolant piped through its interior in proper alignment to prevent leaking of coolant when the draw bar is rotating at very high speeds, for example, 15,000 rpm. Also, the parts need to be movable for tool changes and returnable to their previous positions. These design constraints are satisfied with a draw bar alignment device as shown mounted generally near the end of the draw bar, starting with orientation plate 16. A cylinder 18 is mounted on the plate 16. Guide pins 20, 22 are mounted on the cylinder and are fixed with the cylinder so that they do not move during operation of the machining center. The guide pins extend through a bridge 28. The bridge 28 advantageous helps provide proper alignment of the draw bar, and floats on (that is, is movable with respect to) the guide pins 20, 22. A vacuum chamber 30 surrounds a coolant union 34, and a guard 40 surrounds the coolant union. The coolant union has a rotatable portion 33 and a non-rotatable portion 35. Optionally a sensor (not shown) may be provided under the orientation plate to measure position of a drive belt and pulley which would rotate the draw bar. The sensor may cooperate with a magnet 62 to determine whether the assembly is in the normal, operating position or in a remote position where the tool may be changed and relay that information to a user of the machining center.

Figure 2:
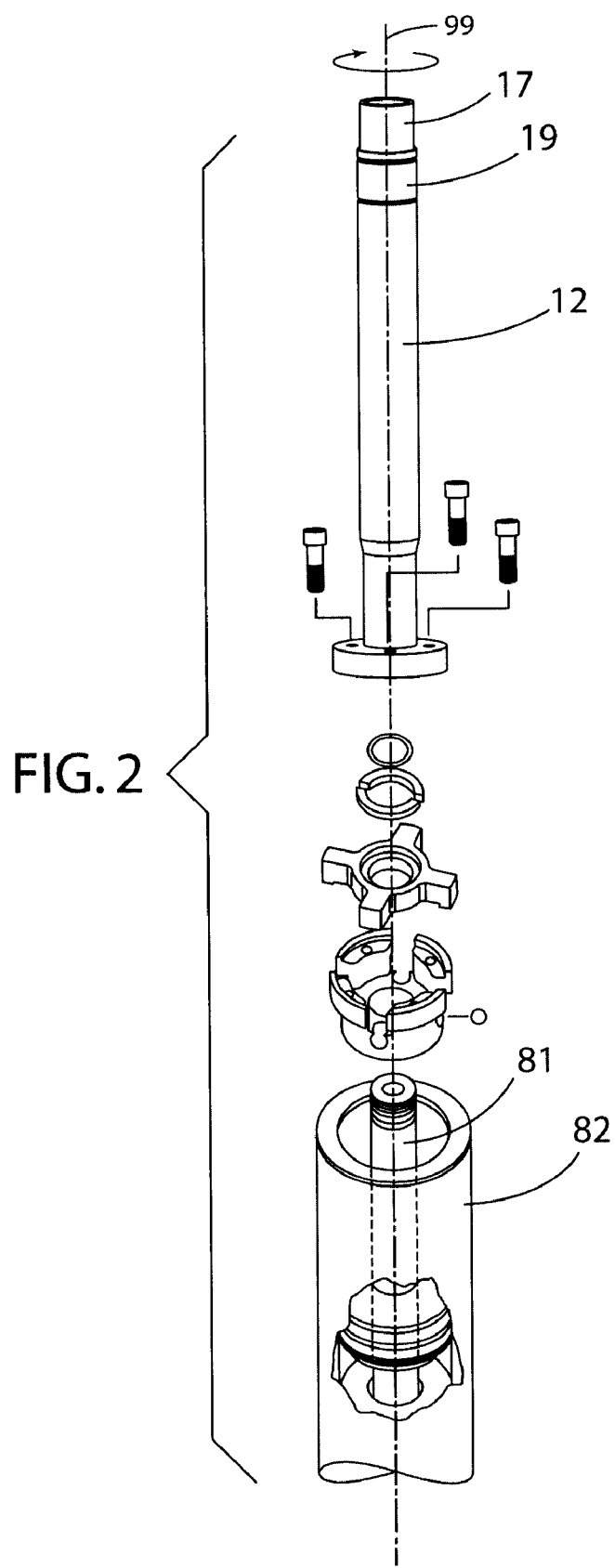
FIG. 2 is an exploded view showing connection of the drive post to the draw bar of the machining center.

FIGS. 2 and 3 are exploded views showing various components of the machining center. A drive post 12 (shown in FIG. 3) has an opening or channel 13 to receive coolant. The drive post 12 is attached to the draw bar 81 positioned inside a spindle 82 with fasteners 49. Thus, the drive post and draw bar rotate together, often at very high speeds during a machining process. The spindle and draw bar are operatively connected to a tool in a conventional manner, such as with a collet chuck (not shown). The drive post 12 and piston rod 14 extend through the opening 94 in the orientation plate 16, through opening 84 in the piston 63, through the opening 74 in the cylinder 18 and up to a rotatable portion 33 of coolant union 34. The drive post 12 is connected to the coolant union 33 near portion 17. Thus, the draw bar, drive post and rotatable portion 33 of the coolant union 34 all rotate together. The piston rod 14 has an opening or channel 15 (shown in FIG. 3) which receives the drive post 12. Advantageously, the drive post separates and spaces apart the coolant union 34 and the draw bar 81, helping to stabilize the assembly and reduce coolant leak. All of the rotatable components rotate about the same axis of rotation 99.

The draw bar, drive post and coolant union are restricted from excessive displacement (with resulting coolant leak) or dislocation from the axis of rotation 99 by captivation within the bridge, and the bridge is effectively reinforced by the guide pins 20, 22. Guide pins 20 and 22 are attached to the cylinder 18 and extend through openings 71, 73, respectively, in the bridge 28. Linear bearings 24, 26 with corresponding spacers 25, 27 extend into corresponding openings 71, 73 in the bridge 28 and fit around the guide pins 20, 22, respectively. The linear bearings allow for relative, controlled axial movement of the bridge with respect to the guide pins. The bridge 28 is provided with an opening 72 which receives the drive post 12 (through bridge insert 29) and a top bearing 46 is secured to the drive post 12 near area 19 with snap rings 47. In accordance with a highly advantageous feature, the top bearing 46 rotates with the drive post 12 and also preferably moves up and down with the drive post as the drive post moves between the operating position and the tool replacement position. In turn, the bridge 28 moves in response to up and down movement of the top bearing 46. The bridge is attached to a vacuum chamber 30. Thus, the draw bar 81, drive post 12, bearing 46 and rotatable portion 33 of the coolant union 34 all rotate together and, the draw bar 81, drive post 12, bridge 28, vacuum chamber 30 and coolant union 34 move up and down together as the assembly moves from the operation position (as shown in FIG. 1) to a tool change position. The bridge 28 permits rotation of the drive post 12, as well as translation along the axis of rotation (during movement between the operating position and the extended position) but continuously resists dislocation of the drive post from the axis of rotation 99.

Several fluid lines are provided. For example, 38 is a fitting for coolant traveling along line 39. 36 is a drain for the coolant union. Valve 50 provides air to cylinder 50. Air line 51 provides air through fitting 52 to top or post bearing 46 located under the vacuum chamber 30. The vacuum chamber 30 preferably comprises two segments 31, 32 fastened together. The two segments cooperate to define an interior which snugly receives an exterior of the non-rotatable portion 35 of the coolant union, and which receives the top bearing immediately below portion 35. Preferably the guard rail 40 which surrounds and protects the coolant union 34 comprises top rail 45 and side rails 41, 42.

When an operator wants to change a tool (move to the tool change position) air from a piston 63 forces the piston rod 14 down from the operating position to an extended position. The piston 63 may be positioned between the orientation plate 16 and the cylinder 18, with a piston seal 64 between the cylinder and the piston. Lock nut 43 mounted on the piston rod overcomes the force of spring 44. Initially in the operating position there is a small gap between the piston rod 14 and a base of the drive post where fasteners 49 are attached to the draw bar. Forcing the piston rod down into engagement with the drive post moves drive post, this moves the post bearing 46 down as well, along with the coolant union 34, vacuum chamber 30 and bridge 28. The effect of moving these components down is for the top ends of the guide pins to extend further beyond the bridge. At this point the assembly components are in the tool changing or extended position and the tool may be changed. That is, the extended position of each component corresponds to the extended position of each of the other components. To move the assembly back to the normal, operating position, the air pressure is released, and springs on the draw bar bias the draw bar (and in turn drive rod, bearing, bridge, vacuum chamber and coolant union) back to the operating position. Return spring 44 is positioned between lock nut 43 and the cylinder, and biases the piston rod 14 back to the operating position. Thus, the coolant union, bridge and vacuum chamber all translate along the axis of rotation 99 in response to translation of the drive post along the axis of rotation when the drive post moves between operating positions and extended positions.

The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machining center having a draw bar extending through a spindle with coolant positioned inside the draw bar for cooling a tool comprising, in combination:
   a piston rod movable between an operating position and an extended position;
   a drive post rotatable about an axis of rotation, operatively connected to the draw bar;
   a coolant union comprising a non-rotatable portion and rotatable portion, wherein the drive post is attached to the rotatable portion such that the rotatable portion is rotatable with the drive post about the axis of rotation; and
   a bridge, wherein the drive post extends through the bridge to attach to the coolant union and the bridge permits rotation of the drive post but resists dislocation of the drive post from the axis of rotation;
   wherein movement of the piston rod from the operating position to the extended position moves the drive post and coolant union to an extended position.

2. The machining center of claim 1 further comprising guide pins extending through corresponding openings in the bridge which permit movement of the bridge along the axis of rotation but resist other relative movement of the bridge with respect to the guide pins.

3. The machining center of claim 2 further comprising a linear bearing positioned over a corresponding guide pin and extending into the corresponding opening in the bridge.

4. The machining center of claim 2 further comprising a cylinder, wherein the guide pins are mounted on the cylinder.

5. The machining center of claim 1 further comprising a piston which moves the piston rod from the operating position to the extended position.

6. The machining center of claim 5 further comprising a return spring which biases the piston rod toward the operating position.

7. The machining center of claim 1 further comprising a vacuum chamber surrounding a portion of the drive post attached to the rotatable portion of the coolant union.

8. The machining center of claim 7 wherein air can be pumped into the vacuum chamber.

9. The machining center of claim 1 further comprising a top bearing attached to the drive post and operatively engaging the bridge to allow rotation of the drive post with respect to the bridge.

10. The machining center 9 wherein the bridge and top bearing translate along the axis of rotation in response to translation of the drive post along the axis of rotation.

11. The machining center of claim 1 wherein the drive post has a channel adapted to receive coolant.

12. The machining center of claim 1 wherein the drive post is movable between an operating position and an extended position, and is urged to the extended position when the piston rod is moved to its extended position.

* * * * *